United States Patent
Alimi

(10) Patent No.: US 9,600,816 B2
(45) Date of Patent: Mar. 21, 2017

(54) METHOD AND SYSTEM FOR EXECUTING A NFC TRANSACTION SUPPORTING MULTIPLE APPLICATIONS AND MULTIPLES INSTANCES OF A SAME APPLICATION

(71) Applicant: INSIDE SECURE, Meyreuil (FR)

(72) Inventor: Vincent Alimi, Blainville sur Orne (FR)

(73) Assignee: Inside Secure, Meyreuil (FR)

( * ) Notice: Subject to any disclaimer, the term of this patent is extended or adjusted under 35 U.S.C. 154(b) by 172 days.

(21) Appl. No.: 14/238,321

(22) PCT Filed: Sep. 25, 2012

(86) PCT No.: PCT/FR2012/052128
§ 371 (c)(1),
(2) Date: Feb. 11, 2014

(87) PCT Pub. No.: WO2013/050684
PCT Pub. Date: Apr. 11, 2013

(65) Prior Publication Data
US 2014/0188713 A1    Jul. 3, 2014

(30) Foreign Application Priority Data
Oct. 4, 2011 (FR) .................................. 11 58943

(51) Int. Cl.
*G06Q 40/00* (2012.01)
*G06Q 20/32* (2012.01)
(Continued)

(52) U.S. Cl.
CPC ....... *G06Q 20/3278* (2013.01); *G06Q 20/204* (2013.01); *G06Q 20/322* (2013.01);
(Continued)

(58) Field of Classification Search
CPC ............. G06Q 20/322; G06Q 20/204; G06Q 20/3278; G06Q 20/3574; G06Q 20/027; G06Q 20/36; G06Q 20/367; G06Q 20/3676
(Continued)

(56) References Cited

U.S. PATENT DOCUMENTS 6,481,632 B2 * 11/2002 Wentker .................... G06F 8/60
235/376
7,472,350 B2 * 12/2008 Hintermeister ....... G06F 3/0482
715/733
(Continued)

FOREIGN PATENT DOCUMENTS

FR    2 945 143 A1    11/2010

OTHER PUBLICATIONS

MasterCard leads nation's first market trial of personalized NFC-enabled mobile phones for payment. (Nov. 2, 2006). Business Wire Retrieved from http://dialog.proquest.com/professional/docview/671311689?accountid=142257 on Nov. 26, 2016.*
(Continued)

*Primary Examiner* — Kito R Robinson
(74) *Attorney, Agent, or Firm* — Brake Hughes Bellermann LLP

(57) ABSTRACT

In a general aspect, a method can include establishing a contactless communication channel with a contactless transaction terminal and receiving a command from the contactless transaction terminal. The command can include an identifier of an application. The method can also include selecting, in a table in response to the command, an instance identifier corresponding with an instance of the application from a plurality of instance identifiers corresponding, respectively, with different instances of the application. Each instance identifier can be associated with a state indicator,
(Continued)

and the state indicator associated with the selected instance identifier can specify that the corresponding instance of the application is in a selectable state. The method can further include transmitting the command to the corresponding instance of the application; activating, in response to receiving the command, the corresponding instance of the application; and executing, by the activated instance, a contactless transaction with the contactless transaction terminal.

19 Claims, 2 Drawing Sheets

(51) Int. Cl.
    *G06Q 20/20*     (2012.01)
    *G06Q 20/34*     (2012.01)
    *G07F 7/10*     (2006.01)
    G06Q 20/36     (2012.01)

(52) U.S. Cl.
    CPC ....... *G06Q 20/3574* (2013.01); *G07F 7/1008* (2013.01); *G06Q 20/36* (2013.01); *G06Q 20/367* (2013.01); *G06Q 20/3676* (2013.01)

(58) Field of Classification Search
    USPC .............................................. 705/39, 35, 41
    See application file for complete search history.

(56) References Cited

U.S. PATENT DOCUMENTS

| | | | | |
|---|---|---|---|---|
| 7,631,810 B2* | 12/2009 | Liu | ...................... | G06Q 20/204 235/375 |
| 7,926,086 B1* | 4/2011 | Violleau | ............... | G06F 21/629 713/161 |
| 8,250,408 B1* | 8/2012 | Cohen | ................. | G06F 11/0709 714/25 |
| 8,775,282 B1* | 7/2014 | Ward, Jr. | ............ | H04L 41/0896 705/34 |
| 9,038,059 B2* | 5/2015 | Ellis | .......................... | G06F 8/61 717/122 |
| 2002/0040936 A1* | 4/2002 | Wentker | ..................... | G06F 8/60 235/492 |
| 2004/0088562 A1* | 5/2004 | Vassilev | ................... | G06F 21/34 726/20 |
| 2004/0111725 A1* | 6/2004 | Srinivasan | ............. | G06F 9/4856 718/105 |
| 2004/0139021 A1* | 7/2004 | Reed | .................... | G06F 21/6218 705/50 |
| 2004/0205769 A1* | 10/2004 | Ruutu | ...................... | H04L 67/10 719/313 |
| 2009/0051294 A1* | 2/2009 | Moning | .................. | B60Q 1/323 315/77 |
| 2010/0284337 A1* | 11/2010 | Luft | ....................... | H04W 84/18 370/328 |
| 2011/0179477 A1* | 7/2011 | Starnes | ................... | G06F 21/52 726/9 |
| 2012/0054663 A1* | 3/2012 | Baek | ....................... | G06F 9/4443 715/772 |
| 2012/0291114 A1* | 11/2012 | Poliashenko | ........... | G06F 21/41 726/8 |
| 2013/0019323 A1* | 1/2013 | Arvidsson | ............. | H04W 12/06 726/30 |
| 2013/0212407 A1* | 8/2013 | Walton | ..................... | G06F 21/72 713/190 |
| 2013/0262302 A1* | 10/2013 | Lettow | .................. | G06Q 20/027 705/41 |
| 2014/0038718 A1* | 2/2014 | Kothari | ............... | G06F 9/44526 463/40 |

OTHER PUBLICATIONS

Orr, B. (2007). 'Wave' of the future? ABA Banking Journal, 99(1), 29(3). Retrieved from http://dialog.proquest.com/professional/docview/671884208?accountid=142257 on Nov. 26, 2016.*
International Search Report issued in International Application No. PCT/FR2012/052128 on Dec. 3, 2012 (with translation).

* cited by examiner

METHOD AND SYSTEM FOR EXECUTING A NFC TRANSACTION SUPPORTING MULTIPLE APPLICATIONS AND MULTIPLES INSTANCES OF A SAME APPLICATION

The present invention relates to near field transactions. Contactless communication techniques by inductive coupling, also called RFID (Radio Frequency Identification) or near field NFC ("Near Field Communication") have been developed to produce contactless payment cards. Such a card makes it possible to perform near field transactions with a transaction terminal like for example a cash point, a sales outlet (ticket machine, food and drink dispenser, payment terminal, . . . ), an automatic paying access control terminal (metro access terminal, bus payment terminal, etc.). To that end, the card comprises a contactless integrated circuit provided with a secure processor and an antenna coil connected to the integrated circuit. The secure processor comprises a central processing unit, an operating system, a Card Application program and/or a Reader Application program. The terminal comprises an antenna coil and is configured to perform a near field transaction with a card by emitting a magnetic field. The terminal may be connected in real time or delay time to a transaction server, to validate a payment and/or debit an account of the user.

It has also been offered to integrate a secure processor and a NFC controller into electronic portable objects such as mobile phones, to perform near field transactions using them. A phone provided with a NFC interface generally comprises a main processor, a radiocommunication circuit, a secure processor of SIM card (Subscriber Identity Module), a NFC controller, an antenna coil connected to the NFC controller, and a secure processor configured to perform NFC transactions. The processor performing the NFC transactions comprises a central processing unit, an operating system, a Card Application program and/or a Reader Application program. In practice, the secure processor performing the NFC transactions may have the form of a Universal Integrated Circuit Card UICC, for example of the mini-SIM or micro-SIM type, which can connect to the circuits of a mobile phone.

The secure processor provided to perform NFC transactions, whether integrated into a contactless card or a portable object, may comprise several installed payment applications, and several installed instances of a same application. Instances of a same application may be distinguished using extended application identifiers comprising a part identifying the application and an extension allowing a particular instance of the application to be identified.

Some contactless terminals manage application identifiers, but not extended application identifiers. The result is that such a terminal cannot address a particular application instance installed in a secure processor with which it tries to perform a NFC transaction. In practice, the same application instance is always activated in the secure processor. Therefore, the user cannot choose a preferred application instance to perform some transactions.

The document U.S. Pat. No. 7,631,810 discloses to install in the secure processor an application instance management application allowing the processor user to select one instance among several instances of the same application. When the corresponding application is to be activated after establishing a contactless communication with a contactless transaction terminal, the instance management application activates the application instance selected by the user. The instance management application then acts for the terminal as if it was the application required by the terminal. This application instance activation is performed either by retransmitting to the application instance the application selection command received by the terminal, or by transmitting an internal selection command to the application instance by the instance management application. The activated application instance may answer to the selection command by supplying the identifier of the instance management application so that the answer is not rejected by the terminal.

This solution requires to modify the existing applications, in particular so that they may receive commands from the instance management application and answer to these commands, and to prevent them from directly answering to a command emitted by a transaction terminal, without going through the instance management application. It may also be required to modify the applications so that they answer to a selection command received from a terminal by supplying the identifier of the instance management application instead of their identifiers. These modifications involve long and expensive development and certification phases, in particular in the case of applications involving a payment transaction or an authentication procedure.

There is therefore a need to perform a transaction with an application instance previously selected by the user and simply activated with an application identifier not allowing a particular instance of the application to be identified, i.e. identifying all the possible instances of the application. There is also a need to offer to the user the ability of selecting an application instance to execute after establishing a communication with a transaction terminal, among several installed instances of a same application.

Embodiments relate to a method for executing a contactless transaction, comprising: establishing a contactless communication between a contactless transaction terminal and a processor, transmitting a command associated with an application identifier from the terminal to the processor, and comprising the following steps executed by an operating system of the processor: searching in a table for an instance identifier corresponding to the application identifier appearing in the command, and associated with a state indicator specifying that an application instance having the instance identifier is in an activable state, and activating the application instance having the instance identifier found in the table, by transmitting the command thereto, the application instance once activated executing a contactless transaction with the transaction terminal.

According to an embodiment, the identifier of an application instance is contained in the application identifier of the corresponding application.

According to an embodiment, the processor implements an operating system complying with the GlobalPlatform standard.

According to an embodiment, the method comprises: transmitting an application instance selection request, associated with an application instance identifier, to an application instance management application installed in the processor, reading the table to search for the application instance identifier appearing in the request, and updating the table to place in the activable state the state indicator associated in the table with the application instance identifier appearing in the request, and placing in a non activable state all the state indicators located in the table, before the instance identifier appearing in the request, and associated with a same application identifier as the application instance identifier appearing in the request.

According to an embodiment, the method comprises transmitting a request of a list of application instances installed in the processor, the list comprising for each installed application instance an application instance identifier and the value of the state indicator associated in the table with the instance identifier, and displaying the list on a display screen.

According to an embodiment, the applications comprise payment applications and each instance of a payment application corresponds to a payment card.

Embodiments also relate to a contactless transaction system of near field type, comprising a contactless transaction terminal and a first processor which may be put in communication with the transaction terminal, configured to implement the method as previously defined.

According to an embodiment, the system comprises a contactless integrated circuit coupled to an antenna coil, the integrated circuit comprising the first processor.

According to an embodiment, the system comprises a mobile phone comprising a main processor, a NFC controller, and the first processor which is connected to the main processor and the NFC controller, the first processor comprising an operating system configured to perform near field transactions through the NFC controller.

Embodiments also relate to a portable device comprising contactless communication means, to establish a contactless communication with a transaction terminal through contactless communication means, the portable device comprising a first processor configured to: establish a contactless communication with a contactless transaction terminal, receive a command associated with an application identifier, the first processor comprising an operating system configured to: search in a table, for an instance identifier corresponding to the application identifier appearing in the command, and associated with a state indicator specifying that an application instance having the instance identifier is in an activable state, and activate the application instance having the instance identifier found by transmitting the command thereto, the application instance once activated executing a transaction with the transaction terminal.

According to an embodiment, the first processor is configured to: receive an application instance selection request, associated with an application instance identifier, and transmit it to an application instance management application, read the table to search for the application instance identifier appearing in the request, and update the table to place in the activable state the state indicator associated in the table with the application instance identifier appearing in the request, and placing in a non activable state all the state indicators located in the table, before the instance identifier appearing in the request, and associated with a same application identifier as the application instance identifier appearing in the request.

According to an embodiment, the device comprises a contactless integrated circuit coupled to an antenna coil, the integrated circuit comprising the first processor.

According to an embodiment, the device comprises a mobile phone comprising a main processor, a NFC controller, and the first processor which is connected to the main processor and the NFC controller, the first processor being configured to perform near field transactions through the controller.

According to an embodiment, the first processor implements an operating system complying with the GlobalPlatform standard.

Embodiments of the invention will be described hereinafter, in relation with, but not limited to the appended figures wherein:

FIG. 1 previously described shows a contactless transaction system comprising a contactless chip card;

FIG. 2 schematically shows a NFC transaction system comprising a mobile phone provided with a NFC controller;

FIG. 3 schematically shows a software architecture of the chip card of FIG. 1 or a secure processor of the mobile phone of FIG. 2, according to one embodiment;

Figure 1:
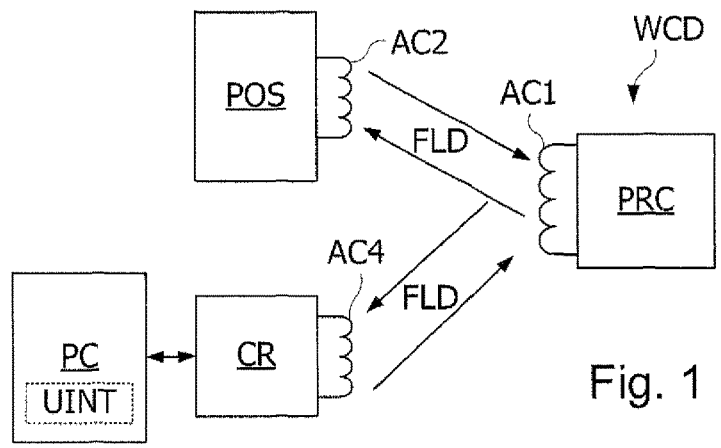

FIG. 1 shows a contactless transaction system, according to one embodiment. The system comprises a contactless integrated circuit WCD, for example housed in a card, and a contactless transaction terminal POS. The terminal POS comprises an antenna coil AC2, and is configured to perform a contactless transaction with a contactless integrated circuit, such as circuit WCD. Circuit WCD comprises a secure processor PRC and an antenna coil AC1 connected to the processor. A transaction comprises exchanging Application Protocol Data Units APDU called application data. The application data comprise commands sent by terminal POS and answers sent by integrated circuit WCD. Terminal POS may be connected in real time or delay time to a transaction server (not shown), to validate a payment and/or debit an account of the user.

Figure 2:
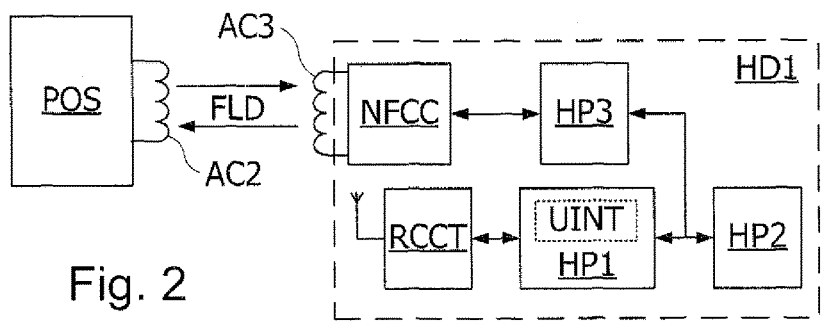

FIG. 2 shows a transaction system comprising a mobile phone HD1 and the transaction terminal POS. The phone HD1 comprises a main processor HP1, a radiocommunication circuit RCCT, a secure processor HP2 of SIM card (Subscriber Identity Module), a NFC controller referred to as "NFCC", an antenna coil AC3 connected to controller NFCC, and a secure processor HP3 configured to perform NFC transactions through controller NFCC. The processor HP1 is connected to processors HP2 and HP3, as well as to controller NFCC. The processor HP3 is connected to controller NFCC through a bus, for example of Single Wire Protocol SWP type. In practice, processor HP3 may be a Universal Integrated Circuit Card UICC, for example of the mini-SIM or micro-SIM type.

Figure 3:
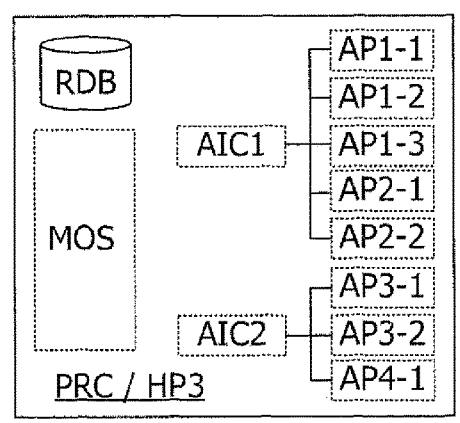

An example of software architecture of processor PRC or HP3 is shown in FIG. 3. The processor PRC or HP3 comprises an operating system MOS and several installed application instances. In the example of FIG. 3, the application instances installed in processor PRC, HP3 comprise instances AP1-1, AP1-2, AP1-3 of an application AP1, instances AP2-1, AP2-2 of an application AP2, instances AP3-1, AP3-2 of an application AP3 and an instance AP4-1 of an application AP4. The applications are for example payment applications, and each application instance corresponds to a payment card for example from a bank. Each application is indicated by a unique application identifier and each application instance is indicated by an application instance identifier called "extended application identifier" comprising the identifier of the corresponding application, associated with a complementary instance identifier allowing the instances of the application to be distinguished between them. The application and application instance identifiers may be such as specified by the ISO 7816 standard. As an example, the identifier of application AP1 is the following:

AA BB CC DD EE FF 10, and the identifiers of instances AP1-1, AP1-2, AP1-3 are the following:

AA BB CC DD EE FF 10 01,
AA BB CC DD EE FF 10 02,
AA BB CC DD EE FF 10 03.

During the execution an application instance, processor HP3 emulates a contactless card and uses controller NFCC in passive mode to perform a transaction with a transaction terminal POS which emits the magnetic field FLD. Terminal POS sends to controller NFCC commands that the latter transmits to processor HP3. Processor HP3 emits answers which are transmitted to controller NFCC, and then to terminal POS by controller NFCC, through a radio-frequency channel RF.

According to one embodiment, processor PRC, HP3 comprises one or more specific application instance management applications AIC1, AIC2. In the example of FIG. 3, application AIC1 performs the management of the instances of applications AP1 and AP2, and application AIC2 performs the management of the instances of applications AP3 and AP4. Each application AIC1 and AIC2 is configured to allow the user to select a single instance by application. Admittedly, each application AIC1, AIC2 may perform the management of all the installed applications.

Some transaction terminals are configured to send only one application identifier during the initiation of a transaction, i.e. without extension specifying a particular instance of the application. When processor PRC, HP3 receives an application identifier to launch the execution of one of applications AP1-AP4, the operating system MOS of processor PRC, HP3 is configured to execute a previously selected instance of the application corresponding to the identifier received.

The operating system MOS of processor PRC, HP3 may perform the management of a register table or base RDB memorizing for each application instance installed in processor PRC, HP3, in particular an identifier of the application instance, associated with a state indicator. The state indicator associated with each installed application instance may in particular take the activable value ("SELECTABLE") or the non activable or locked value ("LOCKED"). The instance management applications AIC1, AIC2 are configured to change this state indicator upon request of a user. According to one embodiment, when the user requests the selection of an application instance, the selected instance is placed in the activable state and all the other application instances are placed in the locked state. When processor PRC, HP3 receives from a terminal POS a request for activating an application, associated with an application identifier and not an application instance, the operating system MOS activates the application instance appearing in the activable state in table RDB.

Figure 4:
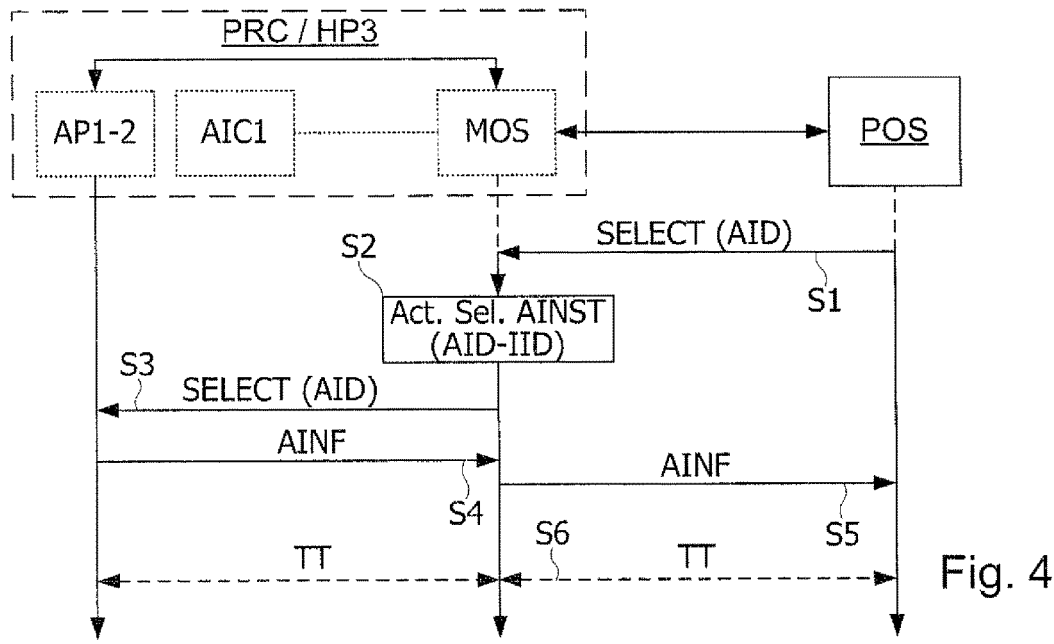
FIG. 4 shows steps of a NFC transaction executed by the NFC transaction system of FIG. 1 or 2, according to one embodiment.

FIG. 4 shows a sequence of activation steps of an application instance, according to one embodiment. This sequence of steps comprises steps S1 to S6 executed once terminal POS and processor PRC, HP3 have initiated a transaction by establishing a contactless communication between them. At step S1, terminal POS transmits a command SELECT for selecting an application to be executed, associated with an application identifier AID not identifying a particular instance of the application. At step S2, processor PRC, HP3 (operating system MOS) receives the command SELECT. The operating system MOS detects that the received identifier AID does not comprise any identifier of an application instance. The operating system MOS therefore accesses table RDB to search therein an instance in the activable state of the application corresponding to the received identifier AID, and gets the extended identifier AID-IID of the instance found in the table. If several instances of a same application are in the activable state in table RDB, the application instance found at step S2 may be the first of the table corresponding to the application identifier AID of the command SELECT received, if the table is sequentially read by the operating system MOS. The result is that if table RDB mentions two instances of a same application in the activable state, the application instance appearing in table RDB in second position is never activated.

At step S3, operating system MOS activates the application instance in the activable state found in table RDB (instance AP1-2 in the example of FIG. 4), and transmits to the activated application instance the command SELECT. At step S4, the application instance AP1-2 corresponding to the complete identifier AID-IID answers to the command SELECT by transmitting information relating to the application instance such as its name, and its identifier AID possibly with its instance identification extension IID. At step S5, the answer of the application instance AP1-2 is transmitted by the operating system MOS to terminal POS. At step S6, a transaction TT such as a conventional payment transaction may then occur between the application instance AP1-2 and terminal POS.

That way, the commands without application instance identifier may be carried by the operating system of processor PRC, HP3, to an instance chosen by the user, without modifying the applications, and without requiring the use of a management application when carrying the command. The use of such a management application may only be required to allow the user to indicate choices of application instances to activate during transactions.

Admittedly, if the command SELECT contains an instance identifier, the operating system MOS may activate the designated application instance without consulting table RDB, and transmits the command thereto. The operating system may also consult table RDB and refuse the activation of the designated application instance if it is in the locked state.

Figure 5:
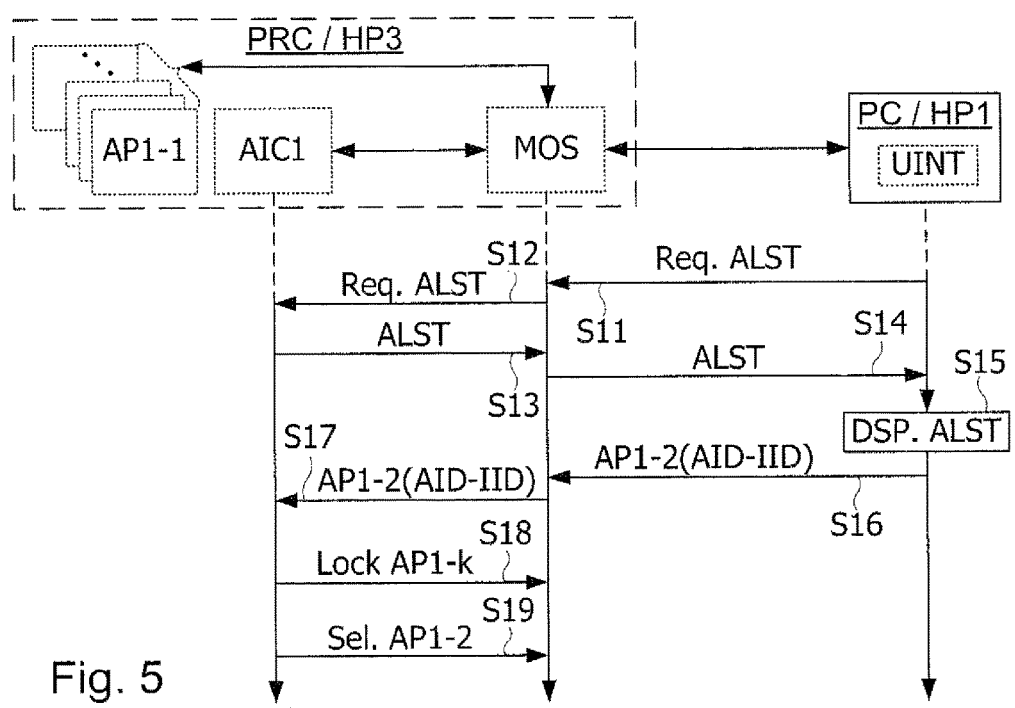
FIG. 5 shows steps of a sequence of selection by the user of an application instance, executed by the NFC transaction system of FIG. 1 or 2, according to one embodiment.

FIG. 5 shows a sequence of steps provided to allow the user to modify the activable/locked state of application instances installed in processor PRC, HP3, according to one embodiment. In the case of processor PRC, the user may access this sequence of steps using a terminal, for example a computer PC connected to a card reader CR (FIG. 1), reader CR comprising an antenna coil AC4 to establish a contactless communication with circuit WSD. In the case of processor HP3, the user may access this sequence of steps by means of the main processor HP1 of the phone using the phone keyboard and display screen. The sequence of steps comprises steps S11 to S19. Steps S11 and S14 to S16 are executed by a management application UINT installed in the main processor HP1 of phone HD1 or in the computer PC. Some of steps S11 to S19 are executed by one of the application instance management applications AIC1, AIC2 (AIC1 in the example of FIG. 5).

At Step S11, application UINT transmits to processor PRC, HP3 a request of list of installed application instances ALST. At step S12, the request is transmitted by the operating system MOS to application AIC1. The request may be transmitted after a conventional command SELECT associated with the identifier of the requested application AIC1. The request may comprise a list of identifiers of applications to be managed. At step S13, the application AIC1 answers the request by transmitting a list of application instances ALST. The list ALST may contain all the application instances installed in processor PRC, HP3 or only the instances of the applications mentioned in the request. The list ALST is transmitted at step S14 by the operating system MOS to application UINT.

At step S15, application UINT displays the received list ALST on the display screen of the computer PC or mobile phone HD1. The transmitted and displayed list ALST may comprise the extended identifiers AID-IID of the installed application instances, each extended identifier being possibly associated with a name of the application and/or application instance, as well as to the activable/locked state of the application instance. The user may thus view the application instances installed in processor PRC, HP3, and those activable during a transaction. On the displayed list, the user may designate an application instance to render activable.

At step S16 executed when the user has designated an application instance, application UINT transmits to processor PRC, HP3 an application instance selection request containing the complete identifier AID-IID of the application instance designated by the user. In the example of FIG. 5, application instance AP1-2 has been selected by the user. At step S17, the selection request is transmitted to application AIC1. At step S18, application AIC1 accesses table RDB to place in the locked state the state indicator associated with each instance AP1-k of application AP1 corresponding to the selected application instance AP1-2. At step S19, application AIC1 accesses table RDB to place in the activable state the state indicator associated with the selected application instance AP1-2.

Admittedly, if table RDB is sequentially read by the operating system MOS when searching an application instance in the activable state (Step S2) to process a command SELECT, it is not necessary to modify the state indicator of the instances of the same application appearing in the table after the application instance to be placed in the activable state.

In addition, steps S11 to S15 may not be required, placing an instance of an application in the activable state and instances of the same application appearing in table RDB in the locked state, may be systematically performed when installing a new application instance in processor PRC, HP3. Thus, if the user wishes to render an application instance activable, s/he may do it by requesting the installation or reinstallation of the application instance in processor PRC, HP3

The operating system MOS implemented by processor PRC, HP3 may satisfy the specifications of the GlobalPlatform standard, version 2.2 or subsequent version (accessible at http://www.globalplatform.org). The GlobalPlatform standard (in particular version 2.2) provides a table in which each installed application instance is associated with a complete identifier of the instance, and in particular to a life cycle state indicator able to have the "SELECTABLE" or "LOCKED" states. This table is completed at each new installation of an application instance. The GlobalPlatform standard 2.2 also provides that a command SELECT associated with an application identifier (without extension to an application instance identifier) is executed by the operating system by consulting the table to search for an instance (the first in the table) in the SELECTABLE state of the application corresponding to the application identifier of the command SELECT. The GlobalPlatform standard indicates that the access to this table is protected and may be authorized by allocating privileges "Global Registry" and "Global Lock". Applications AIC1, AIC2 may thus receive privileges "Global Registry" and "Global Lock" to have the rights allowing them to access table RDB relating to the installed application instances, and to modify the state indicators of other applications.

It will be clear to those skilled in the art that the present invention is susceptible of various embodiments and applications. In particular, the invention is not limited to a processor whose operating system complies with the GlobalPlatform standard, but may be implemented by any processor allowing contactless transactions to be performed with a contactless transaction terminal, and providing the implementation of a management table for activating application instances.

The invention does not necessarily applies to secure transactions, but to any near field transaction. Processor PRC, HP3 is therefore not necessarily secure. The invention may also apply to transactions for accessing public transport, as well as loyalty transactions allocating in particular loyalty points to the user or allowing the user to use the loyalty points accumulated.

In addition, any other identification mode of the applications and application instances may be considered. Thus, it is not necessary that the identifier of an application instance begins with the identifier of the corresponding application, or that the identifier of an application instance contains the application identifier. In this last case, table RDB may memorize the identifier of each application instance installed in processor PRC, HP3, and in association with each application instance identifier, the identifier of the corresponding application, and the state indicator of the application instance.

The invention claimed is:

1. A method for executing a contactless transaction, the method comprising:
   establishing, by a processor, a contactless communication channel with a contactless transaction terminal;
   receiving, by the processor, a command from the contactless transaction terminal, the command including an application identifier of an application;
   selecting in a table, by the processor in response to the command, an instance identifier corresponding with an instance of the application, the table including a plurality of instance identifiers corresponding, respectively, with a plurality of instances of the application, each instance identifier in the table being associated with a state indicator, the state indicator associated with the selected instance identifier specifying that the corresponding instance of the application is in a selectable state;
   transmitting the command to the corresponding instance of the application;
   activating, in response to receiving the command, the corresponding instance of the application; and
   executing, by the activated instance of the application, a contactless transaction with the contactless transaction terminal.

2. The method of claim 1, wherein each of the plurality of instance identifiers includes a respective application identifier of the plurality of instances of the application.

3. The method of claim 1, wherein the processor implements an operating system that is compliant with the GlobalPlatform standard.

4. The method of claim 1, further comprising:
   transmitting, to an application instance manager, an application instance selection request including an instance identifier corresponding with one of the plurality of instance identifiers;

searching, by the processor, the table to identify the instance identifier of the application instance selection request; and in response to identifying the instance identifier of the application instance selection request, updating the table to:

set a respective state indicator associated with the instance identifier of the application instance selection request to a selectable state; and set all other state indicators that are associated with a same application identifier as the instance identifier of the application instance request to a locked state.

5. The method of claim 1, further comprising:

receiving, by the processor, a request for a list of application instances installed in the processor; and in response to the request for the list, providing a list indicating, for each installed application instance, a respective application instance identifier including a value of a respective state indicator.

6. The method of claim 1, wherein the plurality of instances of the application includes a plurality of instances of a payment application, each instance of the payment application corresponding to a respective payment card.

7. A contactless transaction system comprising:

a contactless transaction terminal; and a processor, the contactless transaction terminal and the processor being configured to communicate using near field communication (NFC), the processor being configured to:

establish a NFC contactless communication channel with the contactless transaction terminal;

receive, from the contactless transaction terminal, a command including an application identifier of an application;

select in a table, in response to the command, an instance identifier corresponding with an instance of the application, the table including a plurality of instance identifiers corresponding, respectively, with a plurality of instances of the application, each instance identifier in the table being associated with a state indicator, the state indicator associated with the selected instance identifier specifying that the corresponding instance of the application is in a selectable state;

transmit the command to the corresponding instance of the application;

activate, in response to receiving the command, the corresponding instance of the application, and execute, using the activated instance of the application, a contactless transaction with the contactless transaction terminal.

8. The system of claim 7, further comprising a contactless integrated circuit coupled to an antenna coil, the contactless integrated circuit including the processor.

9. The system of claim 7, wherein the processor is a first processor, the system further comprising a mobile phone including:

a second processor;

a NFC controller, the first processor being coupled with the second processor and the NFC controller, the first processor including an operating system configured to perform near field transactions using the NFC controller.

10. The system of claim 7, wherein each of the plurality of instance identifiers includes a respective application identifier of the plurality of instances of the application.

11. The system of claim 7, wherein the processor includes an operating system that complies with the GlobalPlatform standard.

12. The system of claim 7, the processor being further configured to:

transmit, to an application instance manager, an application instance selection request including an instance identifier corresponding with one of the plurality of instance identifiers, search the table to identify the instance identifier of the application instance selection request, and in response to identifying the instance identifier of the application instance selection request, update the table to:

set a respective state indicator associated with the instance identifier of the application instance selection request to a selectable state, and set all other state indicators that are associated with a same application identifier as the instance identifier of the application instance request to a locked state.

13. The system of claim 7, wherein the processor is further configured to:

receive a request for a list of application instances installed in the processor, and in response to the request for the list, provide a list indicating, for each installed application instance, a respective application instance identifier including a value of a respective state indicator.

14. The system of claim 7, wherein the plurality of instances of the application include a plurality of instances of a payment application, each instance of the payment application corresponding to a respective payment card.

15. A portable device comprising:

a contactless communication interface; and a processor coupled with the contactless communication interface, the processor being configured to:

establish, via the contactless communication interface, a contactless communication channel with a contactless transaction terminal; and receive, from the contactless transaction terminal, a command including an application identifier of an application;

the processor including an operating system configured to:

select in a table, in response to the command, an instance identifier corresponding with an instance of the application, the table including a plurality of instance identifiers corresponding, respectively, with a plurality of instances of the application, each instance identifier in the table being associated with a state indicator, the state indicator associated with the selected instance identifier specifying that the corresponding instance of the application is in a selectable state; the instance identifier being included in a table having a plurality of instance identifiers corresponding, respectively, with a plurality of instances of the application;

transmit the command to the corresponding instance of the application;

activate, in response to receiving the command, the corresponding instance of the application; and executing, by the activated instance of the application, a contactless transaction with the contactless transaction terminal.

16. The device of claim 15, wherein the processor is further configured to:

receive an application instance selection request including an instance identifier corresponding with one of the plurality of instance identifiers;
transmit the application instance selection request to an application instance management application;
search the table to identify the instance identifier of the application instance selection request; and
in response to identifying the instance identifier of the application instance selection request, update the table to:
- set a respective state indicator associated with the instance identifier of the application instance selection request to a selectable state; and
- set all other state indicators that are associated with a same application identifier as the instance identifier of the application instance request to a locked state.

17. The device of claim 15, further comprising a contactless integrated circuit coupled with an antenna coil, the contactless integrated circuit including the processor.

18. The device of claim 15, wherein the device is a mobile phone and the processor is a first processor included in the mobile phone, the mobile phone further including:
- a second processor; and
- a near field communication (NFC) controller,
- the first processor being coupled with the second processor and the NFC controller, the first processor being configured to perform near field transactions using the NFC controller.

19. The device of claim 15, wherein the operating system is compliant with the GlobalPlatform standard.

* * * * *